United States Patent [19]
Bonvicini et al.

[11] 3,907,935
[45] Sept. 23, 1975

[54] OLEFINIC POLYMERS HAVING A HIGH DYE RECEPTIVITY AND METHOD FOR PREPARATION THEREOF

[75] Inventors: Alberto Bonvicini, Terni; Giuseppe Cantatore, Collescipoli (Terni); Fabrizio Balata, Rome, all of Italy

[73] Assignee: Montecatini Edison S.p.A., Milan, Italy

[22] Filed: Aug. 23, 1974

[21] Appl. No.: 500,102

Related U.S. Application Data

[63] Continuation of Ser. No. 359,268, May 11, 1973, abandoned, which is a continuation of Ser. No. 150,861, June 1, 1971, abandoned.

[30] Foreign Application Priority Data
June 3, 1970  Italy.................................. 25448/70

[52] U.S. Cl. .......... 260/895; 260/86.1 N; 260/86.7; 260/89.5 S; 260/89.7 N; 260/895; 260/897 B; 260/897 R; 260/901; 264/210 F; 264/235
[51] Int. Cl.² .................... C08F 29/12; C08F 33/08
[58] Field of Search ........... 260/897, 901, 874, 895

[56] References Cited
UNITED STATES PATENTS

| | | | |
|---|---|---|---|
| 2,845,408 | 7/1958 | Melamed ............................ | 260/897 |
| 3,312,755 | 4/1967 | Cappuccio et al. ................. | 260/859 |
| 3,361,843 | 1/1968 | Miller et al. ........................ | 260/857 |
| 3,415,904 | 12/1968 | Taniguchi et al. ................. | 260/897 |
| 3,554,683 | 1/1971 | Fujisaki et al. ..................... | 8/4 |

*Primary Examiner*—Murray Tillman
*Assistant Examiner*—C. J. Seccuro
*Attorney, Agent, or Firm*—Hubbell, Cohen, and Stiefel

[57] ABSTRACT

A polyolefin composition which is highly receptive to acid, metallized, and disperse dyes comprises a mixture of about 99 to 75 percent by weight of a polyolefin consisting essentially of isotactic macromolecules and about 1 to 25 percent by weight of a basic nitrogen-containing polyamide obtained from the amination of homopolymers and copolymers of esters of alpha, beta-unsaturated acids. The preparation of fibers and shaped articles from this composition is also disclosed.

8 Claims, No Drawings

OLEFINIC POLYMERS HAVING A HIGH DYE RECEPTIVITY AND METHOD FOR PREPARATION THEREOF

This is a continuation of application Ser. No. 359,268 filed May 11, 1973, which is in turn a continuation of application Ser. No. 150,861, filed June 1, 1971 both now abandoned.

BACKGROUND OF THE INVENTION

1. Field of the Invention

The present invention concerns the preparation of textile fibers, films, strips, and other shaped articles composed of olefinic polymers consisting essentially of isotactic macromolecules which are particularly receptive towards acid, metallized, and disperse dyes.

More particularly, the present invention relates to the preparation of dyeable textile fibers by the extrusion of mixes comprising (1) polyolefins consisting essentially of isotactic macromolecules, and (2) basic nitrogen containing polymers obtained by the reaction of homopolymers and copolymers of esters of alpha, beta-unsaturated acids with polyamines.

2. Description of the Prior Art

The use of homopolymers and copolymers of alkyl-amineacrylates as tinctorial modifiers for olefins, and the use of the reaction products of ethylene-acrylic ester copolymers with amines as tinctorial modifiers for polypropylene are well known.

It is also known to use the homopolymers and copolymers of acrylamides as tinctorial modifiers for polypropylene. However, in the latter case, the obtained fibers do not contain basic nitrogen and therefore do not exhibit receptivity toward acid dyes.

Moreover, it is known that the dyeability of polypropylene may be improved by mixing the polypropylene with a polymer or copolymer of a derivative of acrylic acid. The article produced from the mixture is subjected to a post-treatment with various compounds, e.g., amines. Alternatively, a mixture of polypropylene and a graft copolymer of propylene with a derivative of acrylic acid may be formed into an article and this article subjected to said post-treatment, as disclosed in Japanese Patent Application No. 9009/67.

These latter two processes are of little commercial importance since post-treatment of the manufactured articles is difficult, due to the resistance opposed by the polypropylene to the penetration of the amines. Thus, it is necessary to operate under severe conditions, which are uneconomical and difficult to reproduce.

SUMMARY OF THE INVENTION

It has now been discovered that textile fibers and other articles of polyolefins which possess excellent receptivity to acid, metallized and disperse dyes, can be obtained by using mixes consisting of about 99 to 75 percent by weight, and preferably from about 98 to 90 percent by weight, of a polyolefin consisting essentially of isotactic macromolecules, and, correspondingly, about 1 to 25 percent by weight, and preferably from about 2 to 10 percent by weight, of a basic nitrogen-containing polyamide obtained by reaction of a homopolymer or copolymer of an ester of an alpha, beta-unsaturated carboxylic acid with a polyamine.

DESCRIPTION OF THE PREFERRED EMBODIMENTS

Suitable homopolymers and copolymers of esters of alpha, beta-unsaturated acids for use in the present invention include the homopolymers and copolymers of alkyl esters of alpha, beta-unsaturated carboxylic acids containing 3 to 12 carbon atoms, preferably 3 to 6 carbon atoms, such as, acrylic, methacrylic, crotonic, citraconic, fumaric, maleic, itaconic and the like, with an aliphatic alcohol containing 1 to 12 carbon atoms, preferably 1 to 4 carbon atoms, such as as, methyl, ethyl, propyl, butyl and amyl, alcohol and the like.

The copolymers may be formed from any two of the foregoing monomers or any one of the foregoing monomers with another unsaturated monomer copolymerizable therewith, e.g., monomers containing aromatic or heterocyclic rings such as styrene, alpha-methylstyrene, vinyl-toluene, indene, acenapthalene, N-vinylcarbazole, 2-vinyl-pyridine, 2-methyl-5-vinylpyridine and the like.

When the copolymers are formed by ester monomers, each monomer may be present in the copolymer in a molar amount ranging from 1 to 99 percent; however, when one monomer is an ester and the other is a monomer containing aromatic or heterocyclic rings, the monomer ester should be present in the copolymer in a molar amount not less than 5 percent based on the total quantity of the monomers.

The esters polymers and copolymers which are suitable for use in the present invention, have an inherent viscosity, measured in an 0.5 percent chloroform solution at 25°C, preferably ranging from 0.05 to 2, and most preferably from 0.2 to 0.8.

The polyamines which are suitable for use in the amination have the general formula $$A - NH - B$$

wherein A is a hydrogen atom, or an alkyl group having 1 to 12 carbon atoms, preferably 1 to 4 carbon atoms, which may be a part of a heterocyclic ring, and B is an alkyl group having 1 to 12 carbon atoms, containing at least one primary, secondary or tertiary amino group, and which may be part of a heterocyclic ring.

Example of such polyamines are ethylenediamine, hexamethylenediamine, diamine, diethylenetriamine, tetraethylenepentamine, N-(2-aminoethyl)-piperazine, piperazine, N,N-dimethyl-trimethylenediamine, N,N-diethyl-trimethylenediamine, N,N-dimethylethylenediamine, N,N-diethylethylenediamine, N-(3-aminopropyl)-morpholine, N-(3-aminopropyl)-piperidine, N-(2-aminoethyl)-pyrrolidine and the like. If desired, a mixture of two or more such polyamines may be used.

The reaction product, i.e., the basic nitrogen-containing polyamide, obtained from the reaction of the polyamine with the polymer of an ester of an alpha, beta-unsaturated acid, is characterized by the presence therein of the group —CO-N< and of a primary, secondary or tertiary amino group. The basic polyamides may be prepared according to known methods, for example, by the process described in U.S. Pat. No. 2,845,408, incorporated herein by reference and which describes the preparation of linear polyamides by the amination of polyacrylates with amines.

Generally, the basic nitrogen-containing polyamide is prepared by reacting the polymer of the ester of the alpha, beta-unsaturated acid with the polyamine, in the presence or absence of solvents and/or suitable catalysts, by heating the reaction mixture to a temperature The dyeings with acid or pre-metallized acids were carried out in the presence of 1 percent by weight, based on the weight of the fiber, of a surfactant consisting of the condensation product of ethylene oxide with an alkyl-phenol or of the sodium salt of N-oleyl-N-methyl-taurine.

30 minutes after the dye bath started to boil, 2 percent by weight, based on the weight of the fiber, of a solution of 20 percent acetic acid was added to improve the exhaustion of the bath.

The dyeing with disperse dyes was carried out in the presence of 2 percent of surfactant and 3 percent of ammonium acetate based on the weight of the fiber.

After dyeing, the fibers were rinsed in running water. Deep dyeing was found to be effected on the fibers of the present invention whether acid, pre-metallized acid or disperse dyes were used.

The following examples serve to illustrate the present invention without in any way limiting the scope thereof.

EXAMPLE 1

50 g of a polymer containing 5.2 percent of basic nitrogen, obtained by reacting 200 g of a 50:50 styrene/methylacrylate copolymer with 300 g of N,N-diethyl-trimethylenediamine, were admixed with 950 g of polypropylene having a melt index of 21.5, an ash content of 0.008 percent and a residue after heptane extraction of 97.1 percent.

This mixture was then extruded at 220°C and the granulate obtained therefrom was transformed into fibers under the following conditions:

Spinning:
| | |
|---|---|
| Worm screw temperature: | 230°C |
| Extruding head temperature: | 230°C |
| Temperature of spinneret: | 240°C |

The spinneret had 60 holes with a diameter of 0.8 mm and a length of 16 mm each.

| | |
|---|---|
| Maximum extruding pressure: | 50 kg/sq. cm |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the following dyes:

| | |
|---|---|
| Wool Red B | (C.I. acid red 115, N. 27200) |
| Alizarine Blue SE | (C.I. acid blue 43, N. 63000) |
| Lanasyn Red 2GL | (C.I. acid red 216, N. 1182) |
| Lanasyn Brown 3RL | (C.I. acid brown 30, N. 1341) |

The dyed fibers possessed good light fastness and resistance to washing and rubbing.

EXAMPLE 2

40 g of a polymer containing 7.7 percent of basic nitrogen, obtained by reacting 80 g of a 20:80 styrene/methylacrylate copolymer with 152 g of N,N-dimethyl-trimethylenediamine, were admixed with 960 g of polypropylene having a melt index of 21.5, an ash content of 0.008 percent, and a residue after heptane extraction of 97.1 percent. This mixture was then extruded at 220°C and the granulate thus obtained was transformed into fibers under the following conditions:

Spinning:
| | |
|---|---|
| Worm screw temperature: | 235°C |
| Extruding heat temperature: | 235°C |
| Temperature of spinneret: | 245°C |

The spinneret had 60 holes with a diameter of 0.8 mm and a length of 16 mm each.

| | |
|---|---|
| Maximum extruding pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 3

40 g of a polymer containing 6.5 percent of basic nitrogen, obtained by reacting 200 g of a 25:75 styrene/methylacrylate copolymer with 452 g of N,N-diethyl-trimethylenediamine were admixed with 960 g of polypropylene having a melt index of 21.5, an ash content of 0.008 percent and a residue after heptane extraction of 97.1 percent. The mixture was extruded at 220°C and the granulate thus obtained was transformed into fibers under the following conditions:

Spinning:
| | |
|---|---|
| Worm screw temperature: | 230°C |
| Extruding head temperature: | 235°C |
| Spinneret temperature: | 245°C |

The spinneret had 60 holes having a diameter of 0.8 mm and a length of 16 mm each.

| | |
|---|---|
| Maximum extrusion pressure: | 50 kg/sq. cm. |
| Winding speed: | 400 m/min. |

Stretching:
| | |
|---|---|
| Stretching temperature: | 130°C |
| Stretching medium | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 4

30 g of a polymer containing 7.5 percent of basic nitrogen, obtained by reacting 258 g of polymethylacrylate with 781 g of N,N-diethylmethylenediamine were admixed with 970 g of polypropylene having a melt index of 21.5, an ash content of 0.008 percent and a residue after heptane extraction of 97.1 percent.

The mixture was extruded at 220°C and the granulate thus obtained was transformed into fibers under the following conditions:

Spinning:
| | |
|---|---|
| Worm screw temperature: | 235°C |
| Extruding head temperature: | 235°C |
| Spinneret temperature: | 240°C |

The spinneret had 60 holes with a diameter of 0.8 mm and a length of 16 mm each.

| | |
|---|---|
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 5

50 g of a polymer containing 6.5 percent of basic nitrogen, obtained by reacting 80 g of a 75:25 methylmethacrylate/butylacrylate copolymer with 198 g of N,N-diethyltrimethylenediamine were admixed with 950 g of polypropylene having a melt index of 21.5 an ash content of 0.008 percent, and a residue after heptane extraction of 97.1 percent.

The mixture was extruded at 220°C and the granulate thus obtained was transformed into fibers under the following conditions:

Spinning:
| | |
|---|---|
| Worm screw temperature: | 235°C |
| Extruding head temperature | 235°C |
| Temperature of spinneret: | 240°C |

The spinneret had 60 holes with a diameter of 0.8 mm and a length of 16 mm each.
| | |
|---|---|
| Maximum extruding pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 6

50 g of a polymer containing 6.0 percent of basic nitrogen, obtained by reacting 150 g of a 75:25 methylmethacrylate/laurylacrylate copolymer with 292 g of N,N-diethyltrimethylenediamine were admixed with 950 g of polypropylene having a melt index of 21.5, an ash content of 0.008 percent, and a residue after heptane extraction of 97.1 percent. The mixture was extruded at 220°C and the thus obtained granulate was transformed into fibers under the following conditions:

Spinning:
| | |
|---|---|
| Worm screw temperature: | 240°C |
| Extruding head temperature: | 240°C |
| Temperature of spinneret: | 245°C |

The spinneret had 60 holes with a diameter of 0.8 mm and a length of 16 mm each.
| | |
|---|---|
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 7

50 g of a polymer containing 5.2 percent of basic nitrogen, obtained by reacting 200 g of a 50:50 styrene/diethylfumarate copolymer with 302 g of N,N-diethyltrimethylenediamine were admixed with 950 g of polypropylene having a melt index of 21.5, an ash content of 0.008 percent, and a residue after heptane extraction of 97.1 percent.

The mixture was extruded at a temperature of 220°C and the granulate thus obtained was transformed into fibers under the following conditions:

Spinning:
| | |
|---|---|
| Worm screw temperature: | 235°C |
| Extruding head temperature: | 235°C |
| Temperature of spinneret: | 245°C |

The spinneret had 60 holes having a diameter of 0.8 mm and a length of 16 mm each.
| | |
|---|---|
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 8

60 g of polymer containing 4.6 percent of basic nitrogen, obtained by reacting 200 g of a 50:50 styrene/methylmethacrylate copolymer with 520 g of N,N-diethyltrimethylenediamine were admixed with 940 g of polypropylene having a melt index of 21.5, an ash content of 0.008 percent, and a residue after heptane extraction of 97.1 percent.

The mixture was extruded at 220°C and the granulate thus obtained was transformed into fibers under the following conditions:

Spinning:
| | |
|---|---|
| Worm screw temperature: | 230°C |
| Extruding head temperature: | 230°C. |
| Temperature of spinneret: | 240°C |

The spinneret had 60 holes having a diameter of 0.8 mm and a length of 16 mm each.
| | |
|---|---|
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 9

40 g of a polymer containing 10.2 percent of basic nitrogen, obtained by reacting 200 g of a 50:50 styrene/methylacrylate copolymer with 750 g of N-(2-aminoethyl)-piperazine were admixed with 960 g of polypropylene having a melt index of 21.5, an ash content of 0.008 percent, and a residue after heptane extraction of 97.1 percent.

The mixture was extruded at 220°C and the granulate thus obtained was transformed into fibers under the following conditions:

Spinning:
| | |
|---|---|
| Worm screw temperature: | 230°C |
| Extrusion head temperature: | 235°C |
| Temperature of spinneret: | 240°C |

The spinneret had 60 holes of 0.8 mm diameter and 16 mm length each.
| | |
|---|---|
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 10

50 g of a polymer containing 5.3 percent of basic nitrogen, obtained by reacting 262 g of a 50:50 styrene/dimethylitaconate copolymer with 520 g of N,N-diethyltrimethylenediamine were admixed with 950 g of a polypropylene having a melt index of 21.5, an ash content of 0.008 percent, and a residue after heptane extraction of 97.1 percent.

The mixture was then extruded at 220°C and the granulate thus obtained was transformed into fibers under the following conditions:

Spinning:
| | |
|---|---|
| Worm screw temperature: | 235°C |
| Extrusion had temperature: | 235°C |
| Temperature of spinneret: | 240°C |
| The spinneret had 60 holes of 0.8 mm diameter and 16 mm length each. | |
| Maximum pressure of extrusion: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 11

50 g of a polymer containing 5.3 percent of basic nitrogen, obtained by reacting 190 g of a 50:50 styrene/methylacrylate copolymer with 232 g of N,N-diethylethylenediamine were admixed with 950 g of polypropylene having a melt index of 21.5, an ash content of 0.008 percent, and a residue after heptane extraction of 97.1 percent.

The mixture was then extruded at 220°C and the granulate thus obtained was transformed into fibers under the following conditions:

Spinning:
| | |
|---|---|
| Worm screw temperature: | 240°C |
| Extruding head temperature: | 240°C |
| Temperature of spinneret: | 245°C |
| The spinneret had 60 holes of 0.8 mm diameter and 16 mm length each. | |
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 12

40 g of a polymer containing 6.3 percent of basic nitrogen, obtained by reacting 200 g of a 20:80 styrene/methylacrylate copolymer with 538 g of N-(3-aminopropyl)-morpholine were admixed with 960 g of a polypropylene having a melt index of 21.5, an ash content of 0.008 percent, and a residue after heptane extraction of 97.1 percent.

The mixture was then extruded at 220°C and the granulate obtained was transformed into fibers under the following conditions:

Spinning:
| | |
|---|---|
| Worm screw temperature: | 235°C |
| Extruding head temperature: | 235° |
| Temperature of spinneret: | 240°C |
| The spinneret had 60 holes of 0.8 mm diameter and 16 mm length each. | |
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

EXAMPLE 13

30 g of a polymer containing 9.2 percent of basic nitrogen, obtained by reacting 200 g of a 20:80 2-methyl-5-vinylpyridine/methylacrylate copolymer with 380 g of N,N-dimethyltrimethylenediamine were admixed with 970 g of a polypropylene having a melt index of 21.5, an ash content of 0.008 percent, and a residue after heptane extraction of 97.1 percent.

The mixture was then extruded at 220°C and the granulate thus obtained was transformed into fibers under the following conditions:

Spinning:
| | |
|---|---|
| Worm screw temperature: | 230°C |
| Extruding head temperature: | 230°C |
| Temperature of spinneret: | 235°C |
| The spinneret had 60 holes 0.8 mm diameter and 16 mm. length each. | |
| Maximum extrusion pressure: | 50 kg/sq. cm. |
| Winding speed: | 400 m/min. |

Stretching:
| | |
|---|---|
| Stretching temperature: | 130°C |
| Stretching medium: | steam |
| Stretch ratio: | 1:5 |

The fibers thus obtained possessed excellent affinity for the dyes listed in Example 1. The dyed fibers possessed good light fastness and resistance to washing and rubbing.

Variations can, of course, be made without departing from the spirit and scope of the invention.

Having thus described the invention, what is desired to be secured by Letters Patent and hereby claimed is:

1. A dyeable polyolefin composition comprising about 99 to 75 percent by weight of crystalline polyolefine and about 1 to 25 percent by weight of a basic nitrogen-containing polyamide obtained by the reaction of a tertiary polyamine selected from the group consisting of N-(2-aminoethyl)-piperazine, N,N-dimethlethylenediamine, N,N-diethylethylenediamine, N-(3-aminopropyl)-morpholine, N-(3-aminopropyl)-piperidrine, N-(2-aminoethyl)-pyrrolidine, N,N-dimethyltrimethylenediamine and N,N-diethyltrimethylenediamine, with a polymer selected from the group consisting of (1) homopolymers of an alkyl ester monomer selected from the group consisting of alkyl esters of acrylic acid, methacrylic acid, crotonic acid, citraconic acid, fumaric acid, maleic acid, mesaconic acid and itaconic acid, (2) copolymers consisting of said alkyl ester monomers, and (3) copolymers of said alkyl ester monomers with an unsaturated monomer copolymerizable therewith and selected from the group consisting of styrene, alpha-methyl-styrene, vinyl-toluene, indene, acenaphthylene, N-vinylcarbazole, 2-vinylpyridine, and 2-methyl-5-vinylpyridine.

2. The composition of claim 1 wherein the crystalline polyolefine consists essentially of isotactic macromolecules and is obtained from a monomer having the formula $R-CH=CH_2$ wherein R is an alkyl group, an aryl group or a hydrogen atom.

3. The composition of claim 2 wherein the polyolefin is selected from the group consisting of polyethylene, polypropylene, polybutene-1, polystyrene and an ethylene/propylene copolymer wherein the content of propylene is comprised between 99.9 percent and 80 percent in moles.

4. The composition of claim 3 wherein the polyolefin is polypropylene.

5. Fibers, films and ribbons formed from the composition of claim 1.

6. A method for rendering a crystalline polyolefin receptive to metallized, disperse or acid dyes which comprises mixing with said crystalline polyolefin from about 1 to 25 percent by weight based on the weight of the total composition of a basic nitrogen-containing polyamide obtained from the reaction of a tertiary polyamine selected from the group consisting of N-(2-aminoethyl)-piperazine, N,N-dimethylethylenediamine, N,N-diethylethylenediamine, N-(3-aminopropyl)-morpholine, N-(3-aminopropyl)-piperidine, N-(2-aminoethyl) pyrrolidine, N,N-dimethyltrimethylenediamine and N,N-diethyltrimethylenediamine, with a polymer selected from the group consisting of (1) homopolymers of an alkyl ester monomer selected from the group consisting of alkyl esters or acrylic acid, crotonic acid, citraconic acid, fumaric acid, maleic acid, mesaconic acid and itaconic acid, (2) copolymers consisting of said alkyl ester monomers, and (3) copolymers of said alkyl ester monomers with an unsaturated monomer copolymerizable therewith and selected from the group consisting of styrene, alpha-methyl-styrene, vinyl-toluene, indene, acenaphthylene, N-vinylcarbazole, 2-vinylpyridine, and 2-methyl-5-vinylpyridine.

7. The method of claim 6 wherein the polyolefin is selected from the group consisting of polyethylene, polypropylene, polybutene-1, poly-4-methyl-pentene-1, polystyrene and an ethylene/propylene copolymer wherein the content of propylene is comprised between 99.9 and 80 percent in moles.

8. A method for preparing textile fibers comprising melt spinning the composition of claim 1, stretching the filaments thus obtained at a stretch ratio between about 1:2 and 1:20 at a temperature in the range of from about 80° to 150°C and then subjecting the stretched fiber to dimensional stabilization under free or impeded shrinkage at a temperature of from about 80° to 160°C.

* * * * *

UNITED STATES PATENT OFFICE
CERTIFICATE OF CORRECTION

Patent No. 3,907,935　　　　　　　　Dated September 23, 1975

Inventor(s) ALBERTO BONVICINI et al

It is certified that error appears in the above-identified patent and that said Letters Patent are hereby corrected as shown below:

Title page, left side, under "Foreign Application Priority Data": "25448/70" should read -- 25448-A/70 --.

Column 2, line 8: "such as as," should read -- such as, --; line 43: "hexamethylenediamine, diamine," should read -- hexamethylenediamine --.

Column 3, line 9: "anad" should read -- and --.

Column 5, line 48: "6300)" should read -- 63000) --.

Column 9, line 21: "Extrusion had temperature" should read -- Extrusion head temperature --.

Column 10, line 38: "60 holes 0.8 mm" should read -- 60 holes of 0.8 mm --.

Signed and Sealed this thirtieth Day of December 1975

[SEAL]

Attest:

RUTH C. MASON
*Attesting Officer*

C. MARSHALL DANN
*Commissioner of Patents and Trademarks*